UNITED STATES PATENT OFFICE.

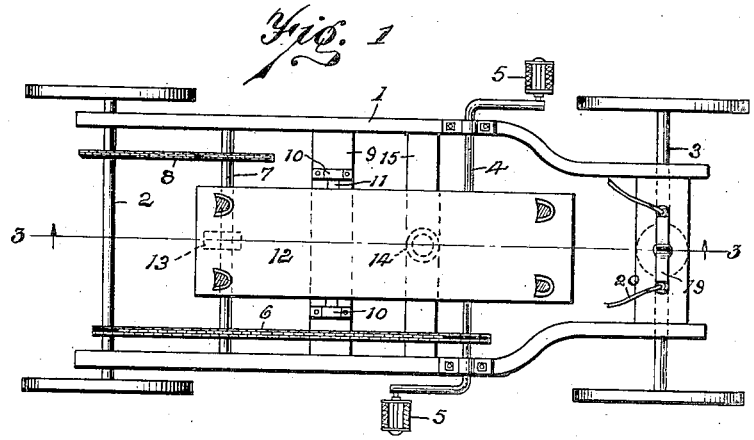
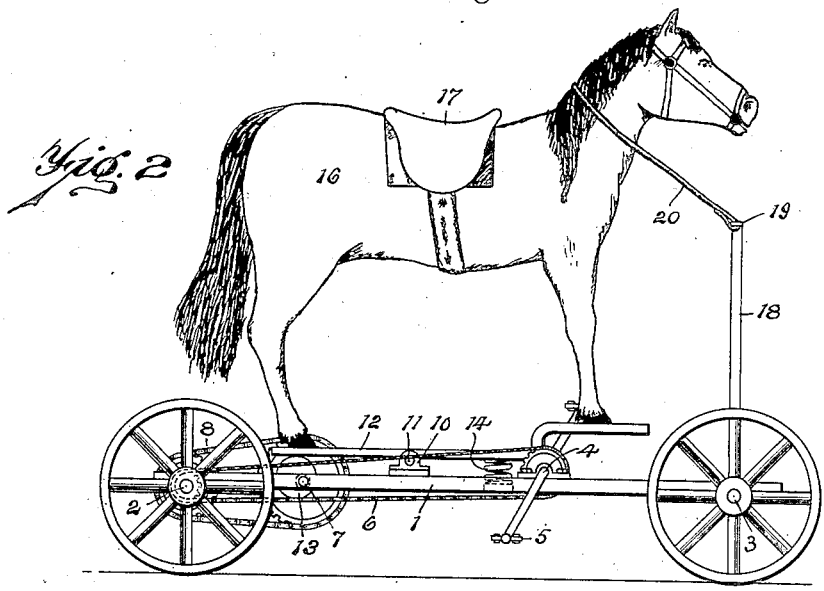
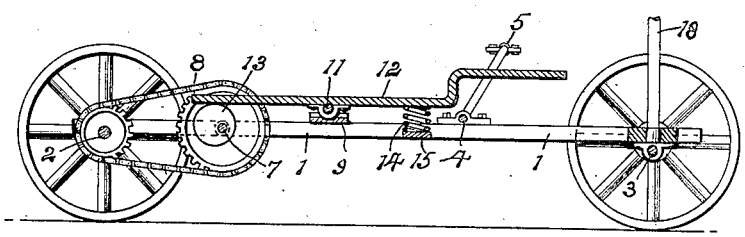

GEORGE AJOUZ, OF DETROIT, MICHIGAN.

VELOCIPEDE.

1,379,604.	Specification of Letters Patent.	Patented May 31, 1921.

Application filed July 23, 1919. Serial No. 312,723.

*To all whom it may concern:*

Be it known that I, GEORGE AJOUZ, a citizen of the United States of America, residing at Detroit, in the county of Wayne and State of Michigan, have invented certain new and useful Improvements in Velocipedes, of which the following is a specification, reference being had therein to the accompanying drawings.

This invention relates to a child's velocipede and more particularly to such a device embodying a hobby horse. The object of the invention is to provide mechanism for imparting to the hobby horse a motion corresponding to the loping gait of a horse trained for horse-back riding, said motion being imparted from the driving gear of the velocipede. A further object is to provide certain other new and useful features in the construction and arrangement of parts, all as hereinafter more fully set forth.

With the above and other ends in view the invention consists in the matters hereinafter set forth and more particularly pointed out in the appended claims, reference being had to the accompanying drawing in which Figure 1 is a plan view of the running gear of the velocipede with the hobby horse removed therefrom;

Fig. 2 is a side elevation of the device embodying the invention, and

Fig. 3 is a longitudinal section substantially upon the line III—III of Fig. 1.

As shown in the drawing, 1 represents a suitable supporting frame provided with a fixed rear axle 2 and a front pivoted axle 3. Mounted transversely in suitable bearings on the frame 1, is a crank shaft 4 provided with pedals 5, and motion is transmitted from the shaft 4 to the rear axle 2 by means of a sprocket chain 6 engaging suitable sprockets on the shaft and axle. A second transverse shaft 7 is mounted upon the frame 1 a short distance forwardly of the rear axle and motion is transmitted from the rear axle to this shaft by means of a sprocket chain 8 engaging suitable sprockets on the axle and shaft. Carried by a suitable transverse member 9 of the frame 1, are bearings 10 for a rock shaft 11 upon which rock shaft is mounted a platform 12, said platform being so mounted intermediate its ends so that the rear end thereof will project over the transverse shaft 7 upon which shaft is secured a cam wheel 13 adapted to engage the underside of the rear end of the platform 12. The rear end of the platform is held in close contact with the cam 13 by means of a coiled spring 14 interposed between a cross member 15 on the frame 1 and the underside of the platform 12 forwardly of its rocking pivot 11. Upon the platform is mounted in any suitable manner, a hobby horse 16 which is provided with the usual saddle 17 for the rider in such a position that his feet may engage the pedals 5 to operate the crank shaft and propel the velocipede. A steering post 18 rises from the front axle 3 so that said axle may be turned to guide the vehicle in the usual manner. On the upper end of the post 18 are laterally extending arms 19 and suitable reins 20 are attached to the ends of the arms 19 and pass around the neck of the hobby horse where they may be grasped by the rider to turn the post and steer the velocipede.

When the velocipede is propelled by means of the crank shaft 4, motion is imparted to the rear axle and from said axle forwardly to the shaft 7. The turning of the shaft 7 operates the cam 13 and this cam being in engagement with the underside of the pivoted platform 12, will impart a rocking motion thereto, the spring 14 exerting a force to substantially hold the rear end of the platform in contact with the cam. The platform is thus given a continuous rising and falling movement at its rear end and a like movement at its forward end, thus imparting to the hobby horse a motion simulating the loping movement of a riding horse.

A movement of the hobby horse may thus be secured which will closely resemble the movement of a good riding horse which has been trained for riding purposes. A very novel and attractive child's vehicle is thus provided and one which will train the child for horse back riding, accustoming him to the loping movement of a horse.

Obviously, changes may be made in the construction of the vehicle and manner of driving the same without departing from the spirit of the invention, and I do not therefore limit myself to the particular construction or arrangement shown.

Having thus fully described my invention, what I claim is:

1. In a child's vehicle, the combination of a running gear, and means for propelling the vehicle mounted thereon, of a member pivotally mounted upon the running gear intermediate its ends with the axis of the pivot therefor extending transversely of the vehicle, a cam member mounted on the running gear to engage beneath one end of said pivoted member, and means for turning the cam driven by the driving mechanism for the vehicle.

2. In a child's vehicle, the combination with a running gear and means mounted on the running gear for propelling the vehicle, of a platform pivotally supported upon the running gear, a transverse shaft on the running gear beneath one end of the platform, a cam on the shaft engaging the under side of the platform and means for transmitting motion to said shaft from the propelling means of the vehicle.

3. In a child's vehicle, the combination with a running gear, and means mounted on the running gear for propelling the vehicle, of a platform extending longitudinally of the vehicle and pivotally supported upon the running gear to rock upon a transverse axis located intermediate the ends of the platform, a shaft on the running gear beneath the platform, a cam on the shaft to engage the under side of the platform, means for imparting motion to the shaft from the vehicle propelling means, and a spring beneath the running gear on the under side of the platform located at the side of the pivotal support of the platform opposite that at which the cam is located.

4. In a child's vehicle, the combination with a running gear, and means mounted thereon for propelling the vehicle, of a platform pivotally supported intermediate its ends to turn upon an axis extending transversely of the vehicle, a shaft on the running gear extending transversely thereof, a cam on said shaft to engage the under side of the platform adjacent the rear end thereof, means for imparting motion to said shaft from the propelling means of the vehicle, a spring interposed between the running gear and the lower side of the platform forwardly of the pivotal support of said platform, a hobby horse mounted upon the platform, and means operatable from the hobby horse to steer the vehicle.

5. In a child's vehicle, the combination of a running gear comprising a supporting frame having front and rear axles, propelling means for said vehicle comprising a transverse crank shaft mounted on the frame and provided with pedals, a sprocket chain engaging sprockets on the rear axle and said crank shaft, a platform, a transverse shaft on the frame forming a pivotal support for the platform intermediate its ends, a cam shaft extending transversely of the frame beneath the platform adjacent its rear end, a cam on the cam shaft, a sprocket and chain connection between said cam shaft and the rear axle, a spring interposed between said frame and platform forwardly of the pivotal support for the platform, a hobby horse mounted upon the platform, and means for steering the vehicle.

In testimony whereof I attach my signature in the presence of two witnesses.

GEORGE AJOUZ.

Witnesses:
ANNA M. DORR,
LEWIS E. FLANDERS.